(12) United States Patent
Gray et al.

(10) Patent No.: US 7,933,202 B2
(45) Date of Patent: Apr. 26, 2011

(54) BOUNDED MINIMAL LATENCY FOR NETWORK RESOURCES WITHOUT SYNCHRONIZATION

(75) Inventors: Scott Gray, Peoria, AZ (US); Nicholas J Wilt, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 151 days.

(21) Appl. No.: 12/364,619

(22) Filed: Feb. 3, 2009

(65) Prior Publication Data

US 2010/0195491 A1 Aug. 5, 2010

(51) Int. Cl.
*H04L 12/26* (2006.01)
*G06F 15/173* (2006.01)

(52) U.S. Cl. ........ 370/230; 370/401; 709/225; 709/206; 726/13

(58) Field of Classification Search .................. None
See application file for complete search history.

(56) References Cited

U.S. PATENT DOCUMENTS

| | | | |
|---|---|---|---|
| 5,850,434 A * | 12/1998 | Ardon | 379/230 |
| 7,242,683 B2 | 7/2007 | Saint Etienne et al. | |
| 7,248,563 B2 * | 7/2007 | Bhogal et al. | 370/230 |
| 7,356,028 B2 | 4/2008 | Saint Etienne et al. | |
| 2003/0115369 A1 | 6/2003 | Walter et al. | |
| 2004/0073671 A1 * | 4/2004 | Maria et al. | 709/225 |
| 2004/0205250 A1 * | 10/2004 | Bain et al. | 709/249 |
| 2005/0111447 A1 * | 5/2005 | Soukup | 370/389 |
| 2006/0047755 A1 * | 3/2006 | Jurova | 709/206 |
| 2006/0050741 A1 * | 3/2006 | Shabtay et al. | 370/492 |
| 2006/0085388 A1 * | 4/2006 | Shinohara et al. | 707/2 |
| 2006/0143309 A1 * | 6/2006 | McGee et al. | 709/250 |
| 2006/0198394 A1 * | 9/2006 | Gotoh et al. | 370/469 |
| 2007/0204338 A1 * | 8/2007 | Aiello et al. | 726/11 |
| 2007/0230501 A1 | 10/2007 | Bibby et al. | |
| 2008/0112439 A1 | 5/2008 | Vestal | |
| 2008/0148341 A1 * | 6/2008 | Ferguson et al. | 726/1 |
| 2008/0192772 A1 | 8/2008 | Kinstler | |
| 2008/0232253 A1 | 9/2008 | Wilt et al. | |
| 2009/0205036 A1 * | 8/2009 | Slaton et al. | 726/9 |
| 2010/0016013 A1 * | 1/2010 | Kabashima et al. | 455/552.1 |

OTHER PUBLICATIONS

Jacobs et al., "Experimental Characterization of QoS in Commercial Ethernet Switches for Statistically Bounded Latency in Aircraft Network", "29th Annual IEEE International Conference on Local Computer Networks", Nov. 2004, pp. 190-197, Publisher: IEEE.

* cited by examiner

*Primary Examiner* — Ricky Ngo
*Assistant Examiner* — Clemence Han
(74) *Attorney, Agent, or Firm* — Fogg & Powers LLC

(57) ABSTRACT

Systems and methods for bounded minimal latency for network resources without synchronization are provided. In one embodiment, a method for managing data traffic between nodes in an asynchronous network comprises: receiving a data request message at a first port of network switch; storing information about the data request message in a memory at the network switch; forwarding the data request message to a producer node; receiving a data message at a second port of the network switch; determining whether the data message is responsive to the data request message; when the data message is responsive, forwarding the data message from the network switch; and when the data message is not responsive, blocking the data message from being forwarded from the network.

15 Claims, 4 Drawing Sheets

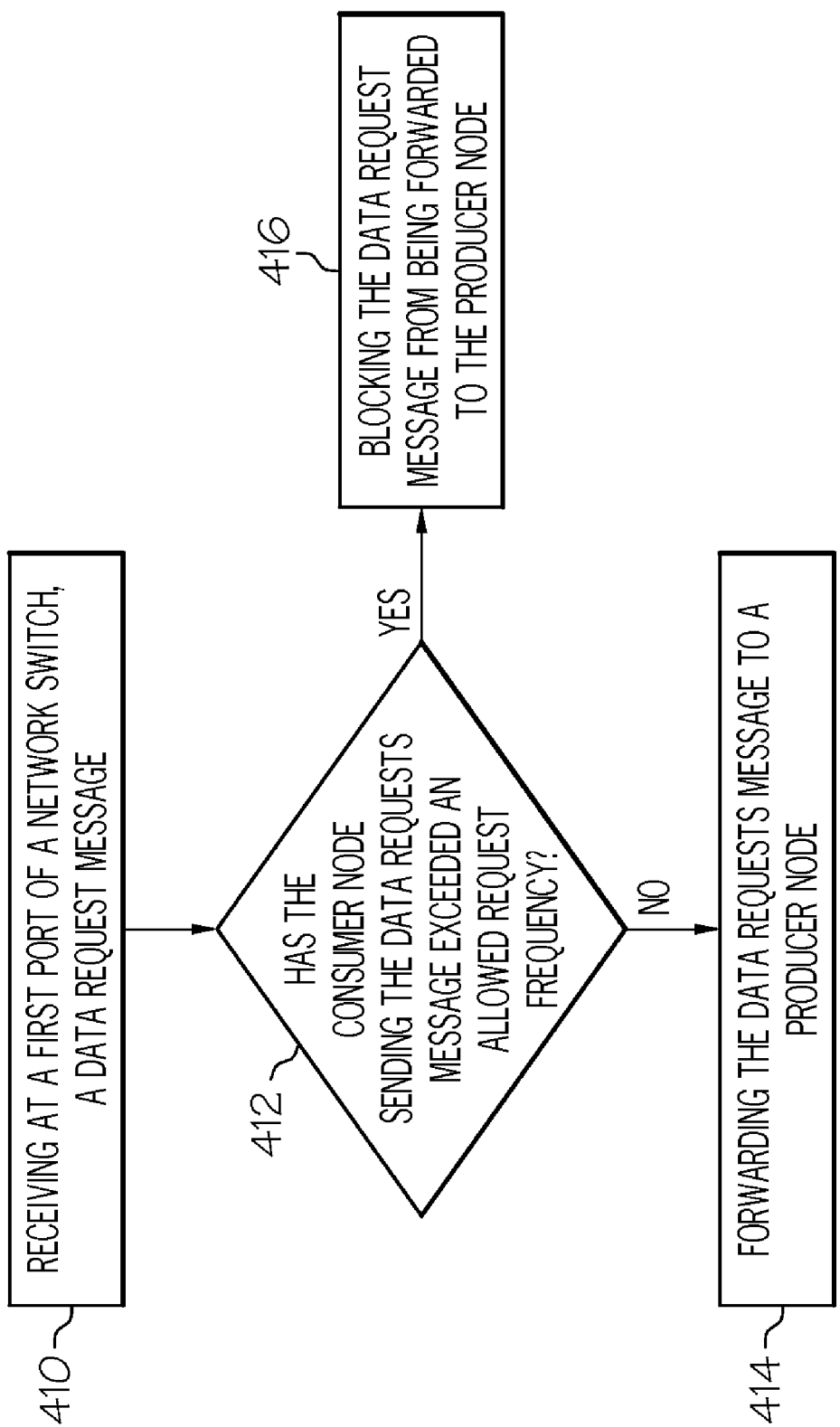

BOUNDED MINIMAL LATENCY FOR NETWORK RESOURCES WITHOUT SYNCHRONIZATION

BACKGROUND

Aircraft networks reduce wiring and improve data movement efficiency but require provable Quality of Service (QoS) and qualities such as latency and jitter are bounded and as small as necessary for required aircraft performance. The two main methods using Ethernet for doing this are Aeronautical Radio, Incorporated (ARINC) standard 664 and Time Triggered Protocol (TTP)-Ethernet. ARINC 664 provides a profiled network approach that allocates bandwidth to all end nodes of the network. All end nodes are asynchronous from each other and broadcast their data across "virtual links" to all subscribers of those links. This creates large latencies and jitter and often requires data to be transmitted at twice the required rate to deal with Nyqiust sampling issues. TTP-Ethernet uses a Time Division Multiple Access (TDMA) approach that allocates time periods to all end nodes of the network. These members must be synchronous and makes scheduling difficult. Also, fault modes must be considered when trying to synchronize across network lanes.

In these systems, data producing nodes push their data on the network. That is, when a data producing node determines that is has data to transmit, it broadcasts the data onto the network. Data consuming nodes, in turn, listen to data from the network. Each consumer node sorts through the data packets it receives to look for relevant data. The producing nodes broadcast each piece of information only once, leaving it up to a consumer node to vigilantly listen to the network to collect any data it needs. A producer node determines what data is to be provided to the network, and when (for example, at a periodic rate or based on a timeslot schedule). The result is that some consumer nodes will receive information that they do not need, and must sort through irrelevant data to find the data that is relevant. In some occurrences, a producer node will transmit packets of data at times when no consuming node requires that particular data.

For example, ARINC 664 is an asynchronous network protocol that utilizes the data "Push". An ARINC 664 packet may include values for 100 different variables in a single message. A consumer node receiving that package would pick through the message to determine if it contains any relevant data. The consumer node may end up needing values for only one or two of the variables, but it will need to look through the entire message to retrieve only those variables of interest. The existing approaches thus increase the necessary overhead at the consumer node as well as latency in supplying consuming nodes the data they need to perform their respective functions.

For the reasons stated above and for other reasons stated below which will become apparent to those skilled in the art upon reading and understanding the specification there is a need in the art for improved methods to address data latency in avionics networks.

SUMMARY

The Embodiments of the present invention provide methods and systems for Bounded Minimal Latency for Network Resources without Synchronization and will be understood by reading and studying the following specification.

In one embodiment, a method for managing data traffic between nodes in an asynchronous network comprises: receiving a data request message at a first port of network switch; storing information about the data request message in a memory at the network switch; forwarding the data request message to a producer node; receiving a data message at a second port of the network switch; determining whether the data message is responsive to the data request message; when the data message is responsive, forwarding the data message from the network switch; and when the data message is not responsive, blocking the data message from being forwarded from the network.

DRAWINGS

Embodiments of the present invention can be more easily understood and further advantages and uses thereof more readily apparent, when considered in view of the description of the preferred embodiments and the following figures in which:

FIG. 4 is a flow chart illustrating a method of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide an asynchronous network where data is not "pushed" onto the network by producer nodes. Instead, in embodiments of the present invention, consumer nodes transmit data requests to producing nodes, which in turn respond with the requested data. Each consuming node thus only receives the information it has requested.

Figure 1:
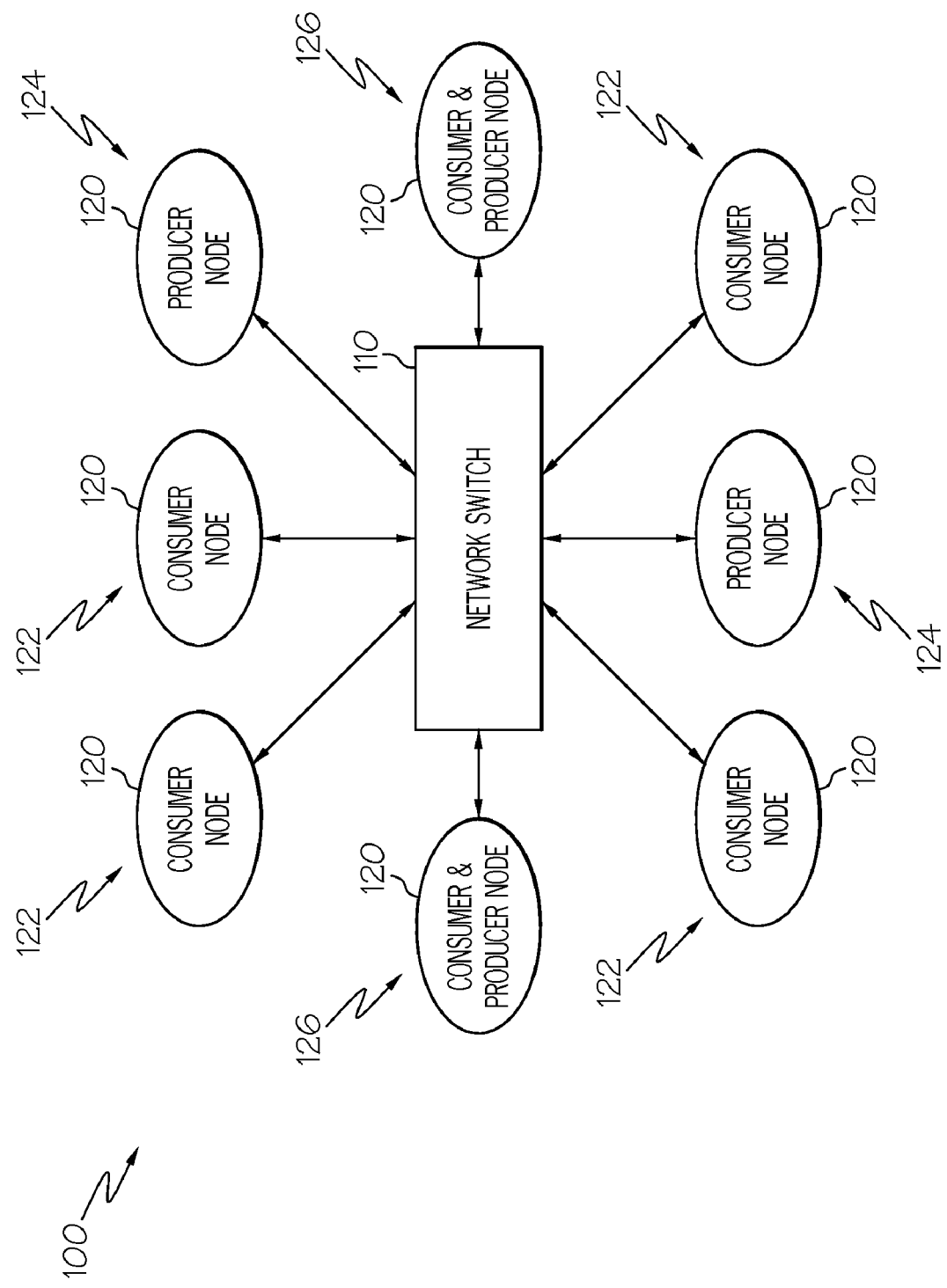
FIG. 1 is a block diagram illustrating an avionics network of one embodiment of the present invention.

FIG. 1 illustrates an asynchronous network 100 for aviation of one embodiment of the present invention. Network 100 comprises a plurality of network nodes 120 that are coupled to communicate with each other via at least one network switch 110. Network 100 includes nodes 120 that are data producer nodes (shown generally at 124), data consumer nodes (shown generally at 122), and nodes 120 that are both producers and consumers of data (shown generally at 126). Those nodes 120 that function as both producers and consumers of data (i.e., nodes 126) behave as described herein as data producer nodes 124 when providing data messages to the network 100 and as data consumer nodes 122 when requesting data from the network 100 via data request messages.

Network 100 operates asynchronously, meaning that network nodes 120 are not restricted to transmit only during scheduled timeslots. Instead, each transmits to the network 100 without the necessity to conform to a network schedule. Network switch 110 incorporates "store and forward" strategy to regulate traffic to and from nodes on network 100 as discussed in greater detail below.

In operation, in one embodiment, a data producer node 124 will propagate a particular set of data (that is, a variable or set of variables) out onto the network 100 based on a request received for that data from a consumer node 122. That is, as opposed to "pushing" unsolicited data onto network 100, producer node 124 waits unit it receives a request from a consumer node 122. Then, in response to the request, producer node 124 transmits a message addressed to the requesting consumer node 122, the message including the requested data and not including unsolicited data. If multiple consumer nodes 122 each request the same data from the same producer node 124, that producer node 124 responds to each request individually. That is, each producer node 124 transmits a separate message to each consumer node 122 that requests that set of data. In this way, there should be a one-to-one correlation between each data message propagating on the network and a previously transmitted data request message. This correlation is verified by network switch 110 as described below. This may result in the same data being propagated on the network multiple times, but also means that every packet of data transmitted on the network has a corresponding node that needs and will use the data.

Embodiments of the present invention thus provide the following advantages. A consumer node 122 will only receive from network 100 the data it needs to fulfill its functions. The data received from network 100 will be delivered directly from a producer node 124 to a consumer node 122 that needs the data. The consumer node 122 will receive data from network 100 only when requested. Such a system effectively opens the door for consumer nodes 122 to effectively synchronize data requests with data transmissions from producing nodes 124 in the sense that consumer nodes 122 are able to obtain data at points in time where they need the data, over an otherwise asynchronously operating network 100. As further explained below, embodiments of the present invention also provide the means wherein a consumer node 122 can, through its data requests messages, synchronize the production of a data set produced by a producer node 124 with the consumer node 122's need for that data set. Communicating data needed by consuming nodes 122 in the "just-in-time" fashion described above reduces network latency from the perspective of consumer nodes 122 and overhead requirements.

Embodiments of the present invention thus aim at optimizing network utilization with a bias toward reduced latency as opposed to a bias towards efficient use of available bandwidth. Network congestion is addressed by utilizing modern high speed networks, such as optical Ethernet, that provide significantly more bandwidth capacity than is required for avionics networks. For example, a 100 MB network commonly found in aircraft today may run with a steady state network utilization of 80%. That same level of data traffic over a 1 GB (or 10 GB) network provided by optical Ethernet would only utilize 8% (or 0.8%) of that Aircraft's network capacity.

In one embodiment, the maximum bandwidth capacity of the network is designed to provide at least one order of magnitude greater than the average expected instantaneous bandwidth usage. In another embodiment, the maximum bandwidth capacity of the network is designed to provide for at least the maximum possible peak bandwidth traffic, assuming every node is continuously transmitting. In another embodiment, the designed maximum bandwidth capacity is based on the sum of the expected data consumption rate for each consumer node times a utilization factor. The utilization factor takes into account that requests from consumer nodes will, by their nature, be staggered in time. The utilization factor also takes into account that certain consumer nodes, during times of critical evolutions, will have higher expected data consumption rates than other times. Thus, a utilization factor need not be a constant value, but may instead be a function of time or other parameter (for example, altitude). Using the guidance provided by this specification, one of ordinary skill in the art would thus be able to determine and design a network having a maximum bandwidth capacity to avoid network congestion when practicing embodiments of the present invention. Embodiments of the present invention provide for timely communication between consumers and producers, from the perspective of applications running on the consumer nodes, because these applications are supplied data to perform their functions as needed and with reduced latency.

Figure 2:
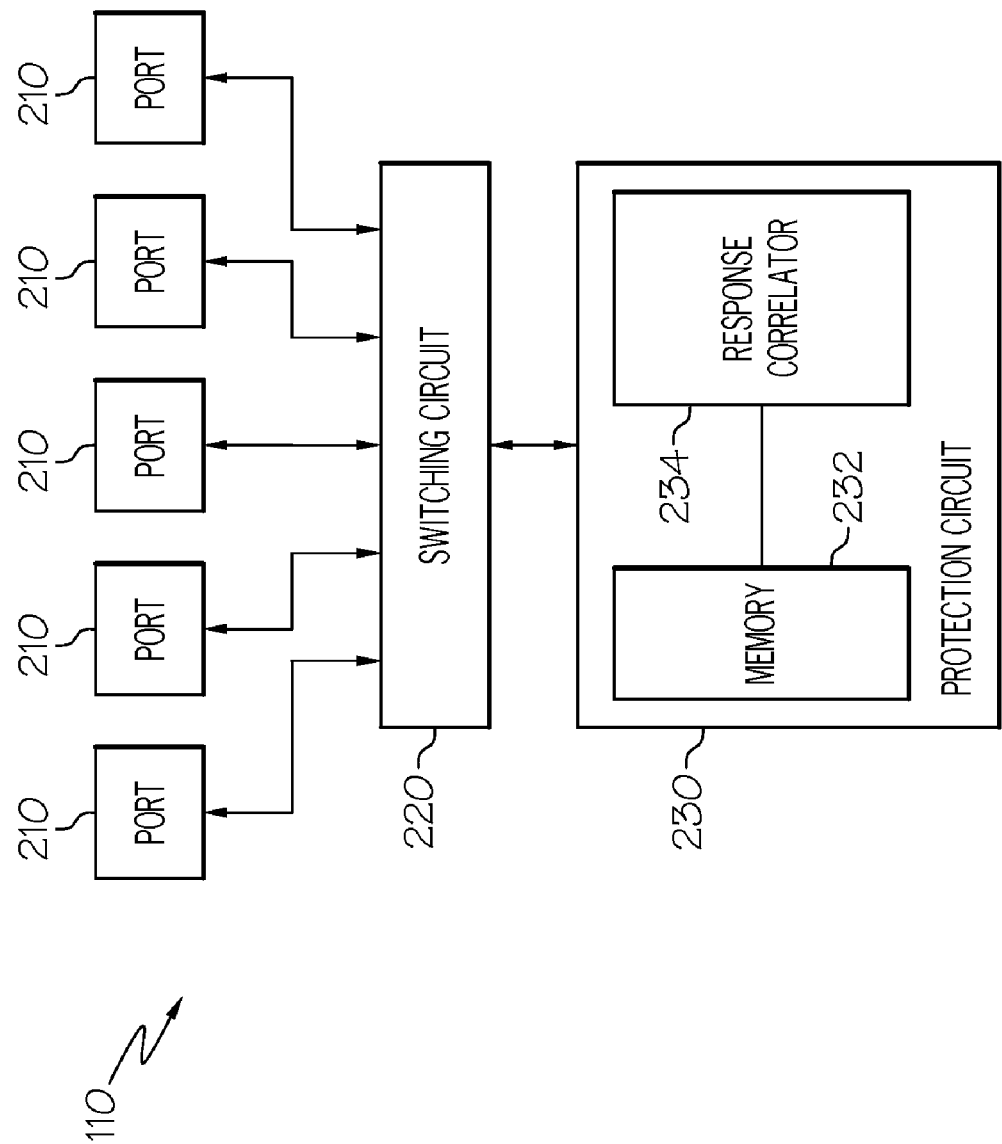
FIG. 2 is a block diagram illustrating network switch of one embodiment of the present invention.

FIG. 2 is a block diagram illustrating network switch 110 of one embodiment of the present invention discussed in FIG. 1. Network switch 110 includes a plurality of ports 210, a switching circuit 220 for routing messages between the ports 210, and a protection circuit 230 described in greater detail below. Although switching circuit 220 and protection circuit 230 are referred to using the term "circuit" herein, one of ordinary skill in the art upon reading this specification would appreciate that as used herein, such circuits are not limited to discrete components. Instead, in alternate implementations of embodiments of the present invention, switching circuit 220 and protection circuit 230 may be implemented using discrete analog or digital components, integrated circuits, a microprocessor or other programmable/configurable device such as a Field Programmable Gate Array (FPGA) or application-specific integrated circuit (ASIC). Switching circuit 220 and protection circuit 230 may be implemented using separate components within switch 110 or may be implemented together within a single or otherwise shared component. Further, the functions described herein being performed by switching circuit 220 and protection circuit 230 may be implemented using algorithms or other software modules resident within a physical memory device and executed by a processor.

The purpose of protection circuit 230 is to monitor and regulate node activity so that a degraded or malfunctioning node does not interfere with network communications. For example, in one embodiment, protection circuit 230 monitors network traffic received on ports 210 to make sure that a producer node 124 is not transmitting unrequited or unresponsive data. In such an embodiment, protection circuit 230 regulates messages pushed by the producer node 124 onto the network by verifying that a corresponding data request message was transmitted to that producer node 124. Accordingly, in one embodiment, protection circuit 230 includes a memory 232 for storing information about data request messages it routes to producer nodes and a response correlator 234 for correlating data messages against the data request message information stored in memory 232. If a data message transmitted by a producer node 124 does not correlate with any data request message information stored in memory 232, protection circuit 230 does not allow switching circuit 220 to forward the data message. In another embodiment, if the data message transmitted by the producer node 124 appears to be in response to a data requests message, but does not contain the requested data (or alternatively, also contains un-requested data) protection circuit 230 again does not allow switching circuit 220 to forward the data request message to a consumer node 122.

Figure 3:
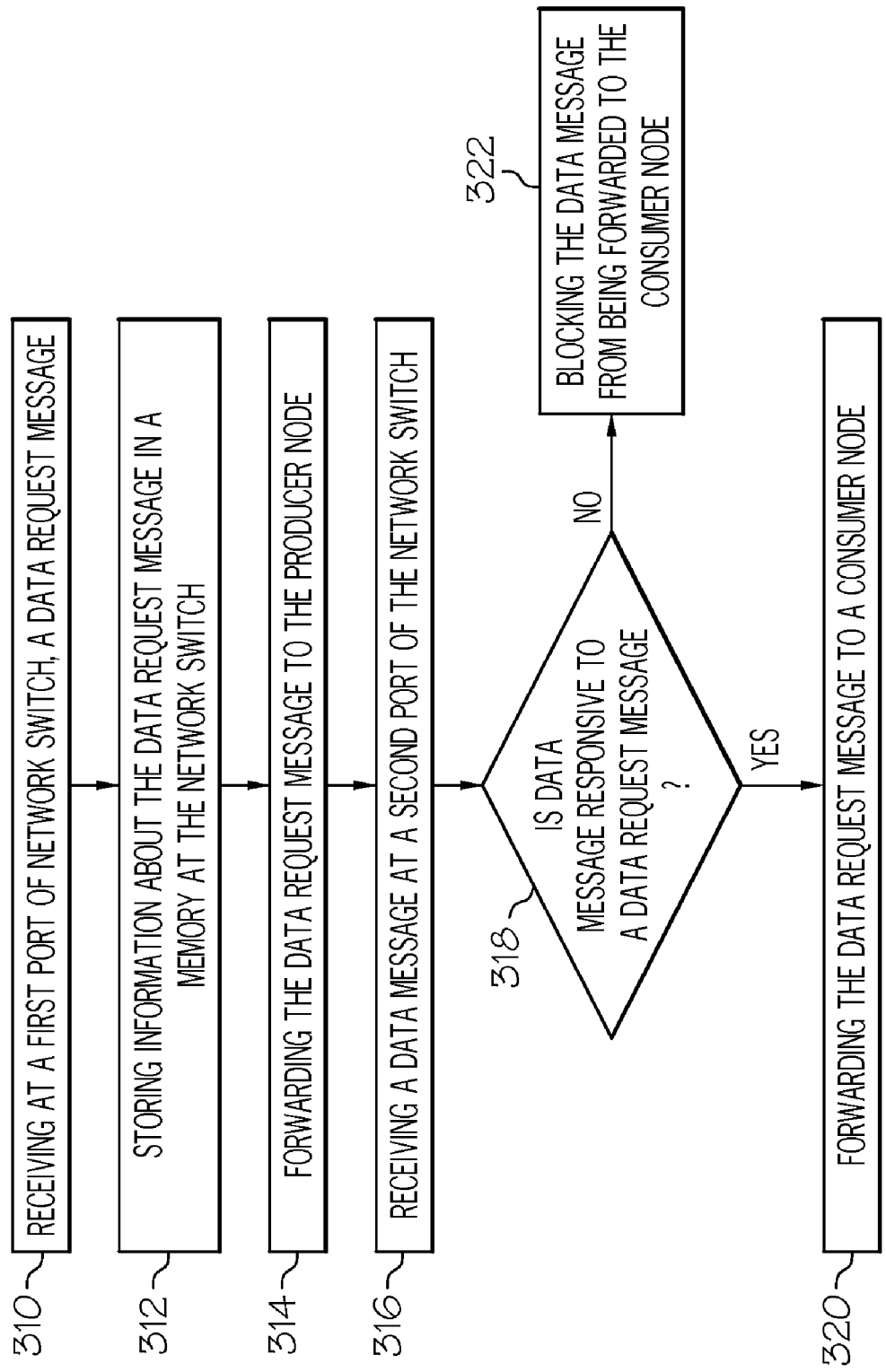
FIG. 3 is a flow chart illustrating a method of one embodiment of the present invention.

FIG. 3 is a flow chart that illustrates a method of one embodiment of such a process just described. The method begins at 310 with receiving at a first port of network switch, a data request message. As discussed above, a data requests message is a message generated by a consumer node on the network, requesting specific data from a specific data producing node. The method proceeds to 312 with storing information about the data request message in a memory at the network switch. This data request information may comprise the address (or other node identifier (ID)) of the consumer node that generated the data request message and the address (or other node ID) of a producer node the data request message was sent to. In one embodiment, the data requests information may further include more detailed information about the data request message such as what data or variables were requested. The method proceeds to 314 with forwarding the data request message to the producer node. The method proceeds to 316 with receiving a data message at a second port of the network switch. A data message is generated by a producing node and, according to the protocol described above, should only be generated in response to a data request message received by that producing node. Further, the data message should be responsive to the data request message meaning that it actually includes (and it limited to) the data requested in the data request message. Accordingly, the method proceeds to 318 with determining whether the data message is responsive to a data request message. In one embodiment, determining whether the data message is responsive is based on correlating the data message against data request information stored in the memory. When the data requests message is responsive, the method proceeds to 320 with forwarding the data request message to a consumer node. When the data request message in not response, the method proceeds to 322 with blocking the data message from being forwarded to the consumer node.

In one embodiment, protection circuit 230 further monitors network traffic received on ports 210 to make sure that a consumer node is not flooding the network by transmitting too many requests over a period of time. Protection circuit 230 thus provides bounded determinism—that is, the network will not break down because one consumer node is trying to over utilize the network. In one embodiments, protection circuit 230 meters the number of requests a consumer node may transmit based on the particular importance of the consumer node (i.e., consumer nodes with more critical functions are allowed more requests per unit time) or based on whether increased traffic is expected from a node based on current flight conditions or activities, or based on the current aircraft configuration.

A method for one embodiment of such a process is illustrated by the flow chart in FIG. 4. The method begins at 410 with receiving at a first port of a network switch, a data request message. The method proceeds to 412 with determining if a consumer node sending the data requests message has exceeded an allowed request frequency. If the consumer node has not exceeded the allowed request frequency (determined at 412), the method proceeds to 414 and the data requests message is forwarded by the network switch to a producer node. If the consumer node has exceeded the allowed request frequency (determined at 412), the method proceeds to 416 with blocking the data request message from being forwarded to the producer node.

One of ordinary skill in the art upon reading this specification would appreciate that the functionality described above with respect to Network Switch 110 may be performed by a central common switch component or may be distributed across multiple interconnected network switches located across the network.

In one embodiment, network switch 110 incorporates "store and forward" strategy to regulate traffic to and from nodes 210. Using "store and forward" strategy benefits from the protocol described above because data request messages are typically small in size in comparison to data messages. As would be appreciated by one of ordinary skill in the art upon reading this specification, traffic on prior art networks were dominated by large unsolicited data messages. With embodiments of the present invention, it is thus relatively less memory intensive for network switch 110 and any other network switching components to store data request messages and then pass them on. At the same time, data responses messages carrying data are also relatively small because they are packaged to contain just requested data. As a result, consumer nodes receiving data messages will also not have to store up as much received data and sort through it to look for desired data, thus reducing storage needs at the consumer node.

As mentioned above, latency, from the perspective of a data consuming node, is improved over prior art networks. Using embodiments of the present invention, a consuming node need not sort though unsolicited data messages in its input buffer and clear them out to get to data needed for applications. This reduces the occurrences of data being stale by the time it reaches the applications that need the data. Because consumer nodes of embodiments of the present invention receive only data needed and requested, everything in their receiving queues is thus something of value. Additionally for consumer nodes associated with dedicated producer nodes, the producer node can utilize the request for data as a synchronization method and produce fresh data in response to the request, further reducing system latency. That is, a producer node can synchronize its data production to a consumer nodes's request for data, thus effectively synchronizing the consumption and production of data over the asynchronous network.

Several means are available to implement the systems and methods of the current invention as discussed in this specification. These means include, but are not limited to, digital computer systems, microprocessors, general purpose computers, programmable controllers and field programmable gate arrays. Therefore other embodiments of the present invention are program instructions resident on computer readable media which when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for managing data traffic between nodes in an asynchronous network, the method comprising:
   receiving a data request message at a first port of network switch;
   storing information about the data request message in a memory at the network switch;
   forwarding the data request message to a producer node;
   receiving a data message at a second port of the network switch;
   determining whether the data message is responsive to the data request message, wherein the data message is deemed not responsive based on whether or not data carried by the data message includes responses for each item of data requested in the data request message;
   when the data message is responsive, forwarding the data message from the network switch; and
   when the data message is not responsive, blocking the data message from being forwarded from the network; and
   determining whether a first consumer node sending the data requests message has exceeded an allowed request frequency;
   when the first consumer node has not exceeded the allowed request frequency, forwarding the data requests message to a producer node; and
   when the first consumer node has exceeded the allowed request frequency, blocking the data request message from being forwarded to the producer node.

2. The method of claim 1, wherein the data request message is a message generated by a consumer node on the network, the data request message requesting specific data from a specific data producing node.

3. The method of claim 1, wherein the data request message comprises a node identifier of a consumer node that generated the data request message and node identifier of a producer node that the data request message was addressed to.

4. The method of claim 1, wherein determining whether the data message is responsive to the data request message further comprises correlating the data message against data request information stored in the memory.

5. The method of claim 1, wherein the data request message identifies what data is being requested by the data request information.

6. A network switching device for a network, the network switching device comprising:
   a plurality of ports;
   a switching circuit for forwarding messages between the plurality of ports; and
   a protection circuit that monitors data requests messages and data messages received on the plurality of ports;
   wherein the protection circuit further comprises:
       a memory that stores data request information about the data request messages; and
       a response correlator that compares the data messages against the data request message information stored in the memory to verify that the data messages are responsive to the data request messages, wherein the data messages are deemed not responsive based on whether or not data carried by the data messages includes responses for each item of data requested in the data request messages;
   wherein when a first data message transmitted by a producer node does not correlate with the data request message information stored in the memory, the protection circuit blocks the switching circuit from forwarding the first data message;
   wherein the protection circuit determines whether a first consumer node sending a first data request message has exceeded an allowed request frequency;
   wherein when the first consumer node has not exceeded the allowed request frequency, the switching circuit forwards the first data request message to the producer node; and
   wherein when the first consumer node has exceeded the allowed request frequency, the protection circuit blocks the first data request message from being forwarded to the producer node.

7. The network switching device of claim 6, wherein the response correlator verifies that a first data message correlates with a corresponding first data request message based on the data request information stored in the memory.

8. The network switching device of claim 7, wherein the data request information comprises a node identifier of a consumer node that generated the first data request message and node identifier of a producer node that the data request message was addressed to.

9. The network switching device of claim 6, wherein the response correlator verifies that the first data message comprises data requested by a corresponding first data request message based on the data request information stored in the memory.

10. A data network system for an aircraft, the network comprising:
    at least one network switch; and
    a plurality of network nodes in asynchronous communication through the at least one network switch, the plurality of network nodes including at least a one data consumer node and at least one data producer node;
    wherein the at least one consumer node transmits data request messages to the at least one data producer node via the network switch, the data request message requesting specific data from the at least one data producer node;
    wherein the at least one data producer node transmits data messages only in response to the data request messages;
    wherein the at least one network switch determines whether a first data consumer node has exceeded an allowed request frequency;
    wherein when the first data consumer node has exceeded the allowed request frequency, the at least one network switch blocks data request messages from the first consumer node.

11. The network of claim 10, wherein a first network switch of the at least one network switch further comprises:
    a plurality of ports;
    a switching circuit for forwarding messages between the plurality of ports; and
    a protection circuit that monitors the data requests messages and the data messages received on the plurality of ports.

12. The network of claim 11, wherein the protection circuit further comprises:
    a memory that stores data request information about the data request messages; and
    a response correlator that compares the data messages against the data request message information stored in the memory to verify that the data messages received on the plurality of ports are responsive to the data request messages received on the plurality of ports.

13. The network of claim 12, wherein the response correlator verifies that a first data message correlates with a corresponding first data request message based on the data request information stored in the memory.

14. The network of claim 12, wherein the protection circuit blocks the switching circuit from forwarding a first data message transmitted by a first producer node when the first data message does not correlate with the data request information stored in the memory.

15. The network of claim 10 wherein the at least one data producer node initiates production of a first data set upon receiving a first data request message, and wherein the at least one data producer node generates a first data message that includes the first data set.

* * * * *